Sept. 6, 1960 D. E. ATKINSON 2,951,973
SIGNALLING SYSTEM
Filed Aug. 28, 1957

INVENTOR.
Duane E. Atkinson
BY Flehr & Swain
ATTORNEYS

United States Patent Office 2,951,973
Patented Sept. 6, 1960

2,951,973

SIGNALLING SYSTEM

Duane E. Atkinson, 102 Fey Drive, Burlingame, Calif.

Filed Aug. 28, 1957, Ser. No. 680,845

1 Claim. (Cl. 317—147)

This invention relates generally to a signalling system and method and more particularly to a signalling system and method which responds to a pure signal having a preselected frequency. The signalling system is particularly suitable for reception of conelrad radio alert warning signals.

The conelrad warning signal generally includes two types of information: (1) two periods of predetermined duration during which the conelrad sending station goes off the air and (2) a period of predetermined duration during which the station transmits a signal having a relatively pure signal frequency.

I has been found desirable to provide automatic systems for energizing alarms and energizing a monitoring speaker for reception of the conelrad message. Generally, two types of automatic systems exist. One in which the absence of a carrier for a predetermined time serves to turn on the various alarm circuits and to energize the monitoring device. The difficulty with this type of automatic device is that if the station goes off the air for a short time the device will automatically energize the alarm circuits even though this may not be the conelrad signal.

The second type of automatic device is one which operates on the tone signal. However, in this type of circuit there is a need for highly selective circuits to discriminate between the conelrad signal and other signal frequencies which may be transmitted during the course of a broadcast program of the sending station. It often happens that during the standard radio broadcast enough signals are transmitted at the selected frequency that they serve to activate the automatic device although the warning signal is not being transmitted.

It is a general object of the present invention to provide an improved signalling system and method which operates only upon the reception of a single, relatively pure signal frequency even though normal program material may occasionally contain the control signal frequency simultaneously with other frequencies.

It is another object of the present invention to provide a system of the above character in which relatively low Q circuits may be employed.

It is still another object of the present invention to provide a system of the above character which is suitable for receiving conelrad warning signals and activating associated alarm circuits and monitoring devices.

It is another object of the present invention to provide a system of the above character which includes a tuned and a broadband channel which operate to give an output signal only when a relatively pure signal frequency is received.

These and other objects of the invention will become more clearly apparent from the following description when read in conjunction with the accompanying drawing.

Referring to the drawing.

Figure 1:
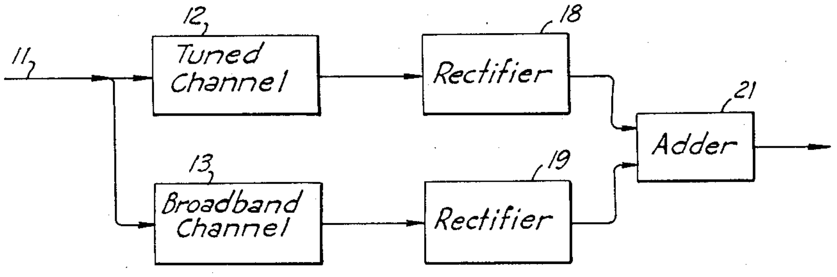
Figure 1 is a schematic block diagram of a suitable system.

Generally, a conelrad monitoring system includes a broadcast band super-heterodyne receiver consisting of mixer, IF stages, detector, amplifiers and speakers. These components are well known in the art and are not illustrated in the drawing.

Referring to the drawings, the output of the amplifier is applied along the line 11 to the tuned channel 12 and the broadband channel 13. These channels have frequency characteristics of the type illustrated by curves 16 and 17, respectively, of Figure 2. The outputs from the tuned and broadband channels 12 and 13 are applied to the rectifiers 18 and 19, respectively. The rectifiers form a D.-C. voltage which is proportional to the output signal of the associated channels. The output of the rectifiers is applied to an adder 21. The polarities of the voltage outputs of the rectifiers are so arranged that the signal from rectifier 19 is subtracted from that from rectifier 18.

When the conelrad signal frequency is not being transmitted, the output of the adder will be a positive voltage as will be presently described. When conelrad signal frequency is being transmitted, the voltage from the rectifier 18 becomes appreciably greater than the voltage from the rectifier 19 and the output of the adder is a negative voltage.

Figure 2:
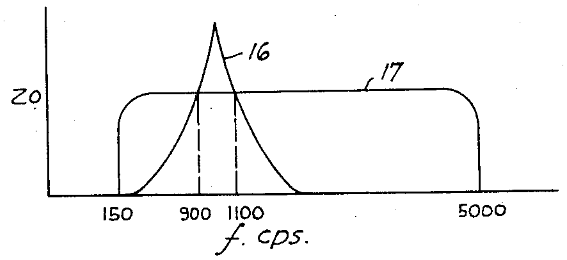
Figure 2 shows the frequency characteristics of the tuned and broadband channels of Figure 1.

Referring to Figure 2, the ordinate is an expression of impedance ($Z_0$) and the abscissa of frequency ($f$). Suitable frequency characteristics of the channels 12 and 13 are illustrated, and it is observed that the channel 12 has a tuned frequency characteristic having a relatively low Q. The other channel has a relatively broadband frequency characteristic which extends from approximately 150 cycles to 5000 cycles.

Figure 3:
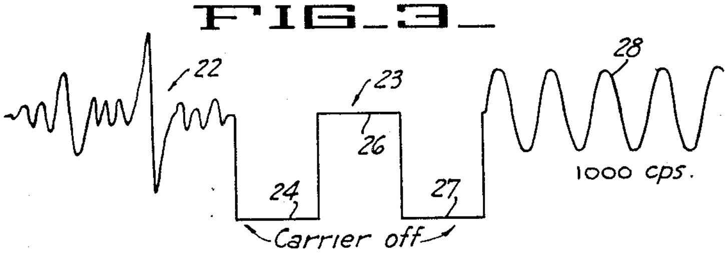
Figure 3 shows a typical signal transmitted by a broadcast station together with the conelrad warning signal.

Referring to Figure 3, a typical signal output of the amplifier when tuned to a broadcast station is illustrated. The portion 22 represents the typical broadcast station signal which includes voice, sound, intelligence, etc. The portion 23 indicates the first portion of the conelrad warning signal. During the time 24 the station is off for a period of approximately 5 seconds. During the portion 26 the station turns back on transmitting only the carrier for approximately 5 seconds. During the portion 27 the station is again off for approximately 5 seconds. Then during the portion 28 a relatively pure fixed frequency signal (1000 cycles) is transmitted for approximately 15 seconds' duration.

Operation of the circuit of Figure 1 when receiving a signal from the audio amplifier of a super-heterodyne receiver or the like is as follows: The signal intelligence during a standard broadcast is spread over the audio band and fills the band between 150 and 5000 cycles. Thus, there is always a relatively high output from channel 13. This is rectified and applied to the adder giving a relatively high D.-C. voltage. In the broadcast there will be certain frequency components which lie within the frequency band of the tuned channel 12. These will be rectified by the rectifier 18 and the voltage is also applied to the adder. However, a pure signal at the predetermined frequency seldom, if ever, occurs in a standard broadcast. Thus, the output of the adder 21 is always positive. Even if a single musical instrument is played at the frequency of the tuned channel, chances are that there are sufficient harmonics to give a positive output from the adder.

However, when the station broadcasts the pure frequency which falls within the tuning curve 16, the output from the broadband channel 13 will be relatively small in comparison to the output from the tuned channel 12. For example, with the characteristics illustrated the output of the tuned channel will be approximately 30 volts while the output of the broadband channel will be approximately 20 volts. The outputs are rectified by the rectifiers 18 and 19 and applied to the adder. Since the signal from the rectifier 19 is smaller than the signal from the rectifier 18, the output of the adder will be a negative signal which is suitable to cut-off an associated tube or activate some other circuit.

Figure 4:
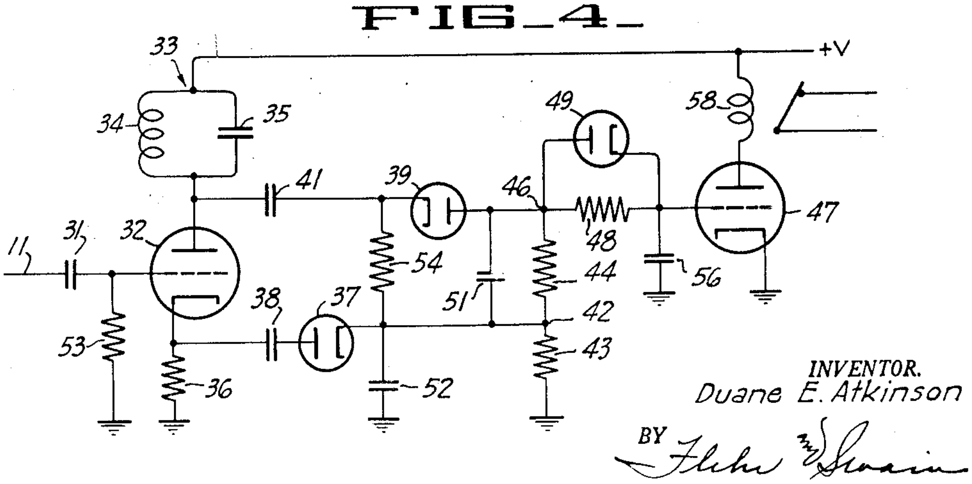
Figure 4 is a circuit diagram of a suitable signalling system.

A suitable circuit is shown in Figure 4. Line 11 is capacitively coupled 31 to the grid of tube 32. A tuned circuit 33 is connected in the plate circuit of the tube 32. The circuit may, for example, include an inductor 34 and a capacitor 35. The tuned circuit may have a relatively low Q. The cathode of the tube is connected to ground through a resistor 36.

A diode 37 is capacitively coupled 38 to the cathode of the tube 32. Thus, for the input to the diode the amplifier tube 32 is acting as a cathode follower. The signal output from the cathode follower is a broadband signal since the cathode will follow all signals which are applied to the grid. A second diode 39 is capacitively coupled 41 to the plate of the tube 32. A signal will appear at the plate only when the signal frequencies applied to the grid lie within the resonant region of the circuit 33. Thus, the diode 39 has a signal applied thereto only when particular signal frequencies are applied to the grid. The output at the plate is the tuned channel and the output at the cathode is the broadband channel. The tube 32 acts more or less like a phase splitter.

The diode 37 has its cathode connected to the common junction 42 of the resistors 43 and 44 and the plate of the diode 39 is connected to the other terminal 46 of the resistor 44.

The grid of the relay tube 47 is resistively coupled 48 to the terminal 46. The combination of resistors 43 and 44 forms the adding circuit. The diode 39 tends to drive the point 46 negative with respect to ground and the diode 37 tends to drive the point 42 positive with respect to ground. The voltage at 46 becomes negative when a relatively pure control signal is transmitted. It is noted that the tube 47 is conducting until the warning signal is transmitted.

The condensers 51 and 52 in the circuit act to filter the signal output of the diodes. Resistors 48 and capacitor 56 act as a slow charging filter network which requires that the pure signalling frequency be present for a short length of time before capacitor 56 charges sufficiently to activate relay tube 47. Diode 49 acts to quickly discharge capacitor 56 if the signalling tone is interrupted for even a short period. This causes the circuit to discriminate between random bursts of relatively pure signalling frequency that might possibly be contained in the program material and a true signal consisting of a sustained tone of the relatively pure signalling frequency.

The broadband channel is purposely cut off in the region of 150 cycles to prevent hum modulation of the sending station from preventing the signalling system from working due to the continuous presence in the broadband channel of this low frequency hum. If hum is negligible, the broadband channel may be extended down to 20–40 c.p.s. for greater discrimination against broadband program material.

A system was constructed as illustrated in Figure 4. The various components had the following values:

| | | |
|---|---|---|
| Tubes 32 and 47 | | 6BQ7A |
| Diodes 37, 39 and 49 | | 6BC7 |
| Resistors: | | |
| 36 | ohms | 10K |
| 43 | do | 470K |
| 44 | do | 470K |
| 48 | megohms | 10 |
| 53 | megohms | 1 |
| 54 | ohms | 470K |
| Capacitors: | | |
| 31 | microfarads | .05 |
| 35 | do | .05 |
| 38 | do | .05 |
| 41 | do | .05 |
| 51 | do | .05 |
| 52 | do | .05 |
| 56 | do | 1 |
| Inductor 34 | henrys | .5 |
| Relay coil 58 | | 2500Ω |

Apparatus constructed in accordance with the above was connected to receive the output of a standard superheterodyne receiver which was continuously tuned to a key conelrad station. The relay in the plate circuit of tube 4 which was activated was de-activated only when a conelrad test signal was transmitted by the key station.

Although the system has been described with reference to the conelrad warning system, it is apparent to one versed in the art that the system may be used for other types of tone signalling. For example, in telephone circuits the system might be used to discriminate between a control signal and the voice or other signal intelligence. Similarly, in broadcast stations it might be desirable to transmit a control signal to various points.

Thus, it is seen that an improved signalling system is provided. The system is activated only by a pure signal of predetermined frequency. Even though other signals may be received which include the particular frequency, the system is not activated. Only when a relatively pure signal is received is the system activated. The system employs low Q circuits, is easy to construct and the component parts required are relatively inexpensive.

I claim:

A signalling system for forming a signal from a relatively pure signal frequency transmitted for a short time over a transmitting channel which is transmitting other signals possibly including the pure signal frequency comprising a first amplifier including two current carrying electrodes and a control electrode, signal input means connected to the control electrode of said first amplifier, a resonant circuit coupled in the circuit of one of said current carrying electrodes of said first amplifier, said resonant circuit being tuned to said pure signal frequency, a resistor connected in the circuit of the other current carrying electrode of said amplifier, a first and second rectifying means connected to different ones of said current carrying electrodes whereby one of said rectifying means serves to receive a narrow band of frequencies and the other means serves to receive a relatively broad band of frequencies, adding means for receiving the output of said rectifiers and forming an output signal corresponding to the difference between the rectified signals, a slow charging filter, a second amplifier, the output of said adding means being applied to the input of said second amplifier through said slow charging filter, a third rectifier in circuit with said slow charging filter and poled to discharge said filter in the absence of an output signal from said adder, said second amplifier including a utilization circuit, and means for connecting a source of operating potential to said first and second amplifiers.

References Cited in the file of this patent

UNITED STATES PATENTS

| | | |
|---|---|---|
| 2,145,053 | Meszar | Jan. 24, 1939 |
| 2,231,174 | Trogner | Feb. 11, 1941 |
| 2,397,539 | Dent | Apr. 2, 1946 |
| 2,537,998 | Henquet et al. | Jan. 16, 1951 |
| 2,722,677 | Krueger | Nov. 1, 1955 |
| 2,834,879 | Bauman | May 13, 1958 |
| 2,852,622 | Fedde et al. | Sept. 16, 1958 |